C. S. LOCKWOOD.
THRUST RING.
APPLICATION FILED AUG. 21, 1911.
1,053,413.
Patented Feb. 18, 1913.
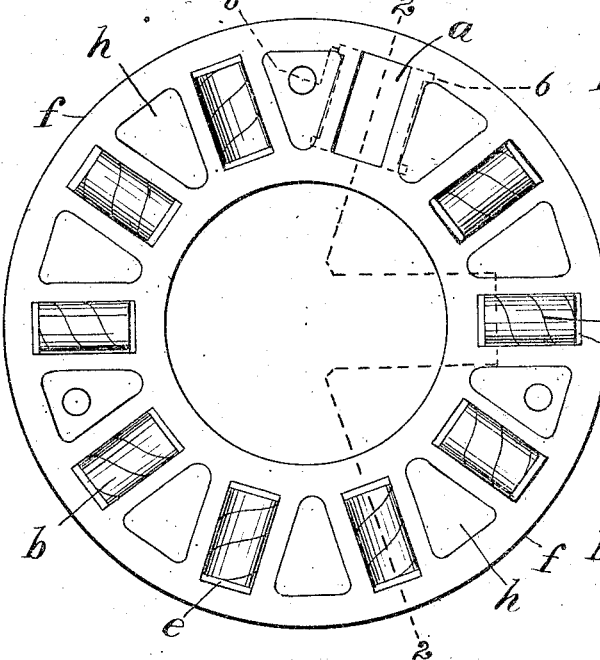
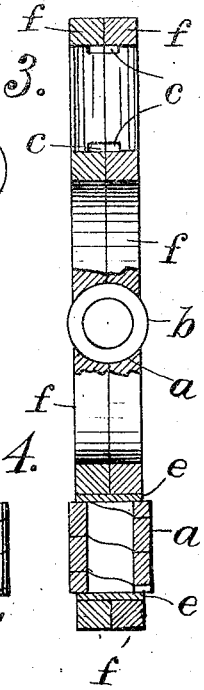
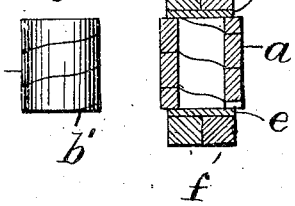
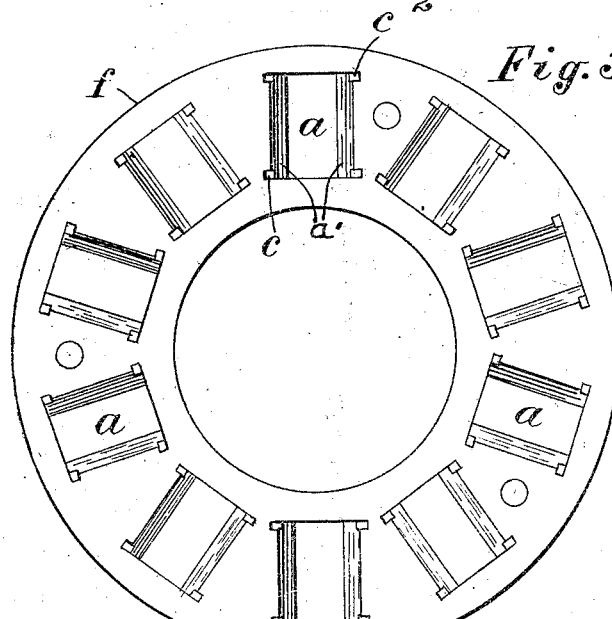
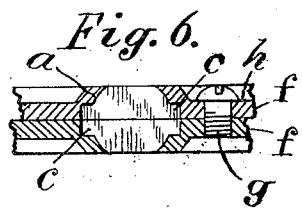
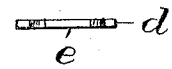
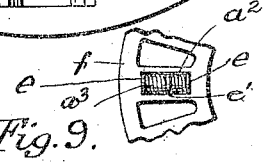
Witnesses:
L. Lee.
A. B. Meier.
Inventor.
Charles S. Lockwood, per
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

THRUST-RING.

1,053,413.  Specification of Letters Patent.  Patented Feb. 18, 1913.

Application filed August 21, 1911. Serial No. 645,264.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Thrust-Rings, fully described and represented in the following specification and the accompanying drawings, forming a part of the same.

This invention relates to that class of thrust-bearings which is formed as a loose ring to encircle a shaft between the parts subjected to thrust, and the invention is especially applicable to such a thrust-ring carrying a series of spirally wound rolls. In such rolls the ends of the strand forming the roll taper off to a chisel edge at each end of the roll, and are thus liable to chafe or abrade the metal of the thrust-ring at the end of the socket inclosing the roll, whenever the roll from any cause presses endwise in its socket.

The objects of the present invention are, first, to furnish a cheap construction for the roll-carrying ring, by which it may be formed (with suitable roll-sockets) of relatively soft metal, so as to be shaped cheaply and accurately by die casting; and second, to prevent the abrasion or wear of the sockets by the ends of the rolls, in such a soft metal ring, so that the rolls may be formed of steel, and hardened.

The invention will be understood by reference to the annexed drawing, in which—

Figure 1 is a side view of the complete thrust-ring with one of the rolls omitted; Fig. 2 is a section of the same on line 2—2 in Fig. 1; Fig. 3 is an end view and Fig. 4 a side view of a spirally wound roll; Fig. 5 shows the inner side of one of the ring-plates; Fig. 6 is a section on line 6—6 in Fig. 1; Fig. 7 is a side view, Fig. 8 an edge view of one of the wearing pieces, Fig. 9 shows an alternative construction.

In Figs. 1 to 9 inclusive, the ring is shown with apertures forming ten radial sockets *a* to carry ten cylindrical rolls *b*, the ring being divided into two similar ring-plates *f* at the center of the rolls, and the half-sockets in such plates concaved in the usual form to fit the sides of the rolls as shown at *a'* in Fig. 5, and open upon the outer sides of the plates, so that the sides of the rolls project from the sockets upon both sides of the ring.

To make the ring-plates *f* cheaply, I form them of alloy (as type metal) that can be readily cast in a metal die, and thus secure accuracy of shape and suitable finish without any machine-work upon them; but by such mode of construction they are necessarily much softer than the hardened rolls, and very liable to abrasion by the chisel-shaped end of the spirally wound rolls.

There is a great demand at the present time for so-called "high duty" bearings in which a small bearing is adapted to sustain a heavy load by making the rolls of hardened steel. Such steel rolls are very unyielding if made of solid steel, and I have therefore devised the bearing with the tubular spirally wound rolls, which possess considerable elasticity, and which can be used with the die-cast ring-plates by providing the roll-sockets with the wearing-pieces *c*, which may be made of steel hardened to the same temper as the rolls, and thus enabled to resist wear most perfectly.

In Figs. 2 and 4, the roll is shown formed of a spirally wound strand, which terminates at each end of the roll in a bevel or chisel-shaped end *b'*, and if such a roll be made of hardened steel, the ends *b'* would be capable of grinding or wearing into the metal at the ends of the roll-socket; and this is prevented by the stationary wearing-pieces.

Notches *c* are shown formed in the four corners of each half-socket, to receive lugs *d* on the ends of the flat wearing-pieces *e*, which are shaped, as shown in Fig. 7, to fill or cover the ends of the socket, and thus hold the ends of the rolls from contact with the ends of the sockets.

The lugs upon the wearing-pieces prevent the same from turning in the sockets, and the edges of the said pieces are even or flush with the outer surfaces of the ring-plates *f*.

Fig. 6 shows clearly the half-sockets formed in the two ring-plates in which the wearing-pieces are fitted before the halves of the ring-plates are secured together by the screws *g*. By this arrangement the wearing-pieces are held in place by the curved sides of the half-sockets and are enabled to extend across the joint of the ring-plates and thus wholly protect the ends of the sockets from wear. The fastening of the ring-plates together serves to hold the wearing-pieces positively within the sockets and thus prevents their displacement in the slightest degree. As such wearing-pieces can be stamped from sheet-metal and tempered in batches, they furnish a very cheap protection for the ends of the socket. If they were permitted to rotate in the sockets they would wear the sockets seriously when the rolls pressed endwise, but their stationary character imposes all the wear upon the steel surfaces, which are fitted to sustain it.

The ring-plates $f$ are shown secured together by screws $g$, the heads of which are contained in recesses $h$ formed in the outer sides of the ring-plates; which recesses also serve to lighten the said plates.

Fig. 9 shows a modification in which the rolls are divided transversely, and a wearing-piece $e'$ inserted between their adjacent ends. This construction permits the outer section $a^3$ of the roll to rotate faster than the inner one $a^2$, as required by its greater distance from the center of the thrust-ring; while the wearing-piece $e'$ prevents the sections of the roll from abrading one another. This piece $e'$ may be held stationary by the same means as the pieces $e$.

Having thus set forth the nature of the invention what is claimed herein is:

1. A thrust-ring having two ring-plates with corresponding half-sockets in each, rolls fitted to turn in the sockets and projected from the opposite sides of the ring, and flat wearing-pieces fitted within the ends of the sockets adjacent the ends of the rolls and held from turning in the sockets and extending across the joint of the ring-plates.

2. A thrust-ring formed of two similar soft metal ring-plates $f$ having corresponding half-sockets therein with hardened spirally wound rolls in the said sockets, and flat wearing-pieces fitted between the ends of the rolls and sockets and held from turning therein and extending across the joint of the ring-plates.

3. A thrust-ring formed of two similar soft metal ring-plates $f$ having corresponding half-sockets $a$ therein with notches $c$ in the inner corners, rolls fitted to the sockets, wearing-pieces having lugs $d$ fitted to the said notches to hold the wearing-pieces from turning and means for securing the ring-plates together with the rolls in the sockets and the wearing-pieces extended across the joints of the ring-plates.

4. A thrust-ring having two ring-plates with corresponding half-sockets in each, rolls fitted to turn in the sockets and divided transversely into sections and projected from opposite sides of the ring, flat wearing-pieces fitted to each socket between the adjacent ends of the roll-sections, and wearing-pieces within the ends of the sockets, the wearing-pieces being held from turning in the sockets and extending across the joint of the ring-plates.

In testimony whereof I have hereunto set my hand in the presence of two subscribing witnesses.

CHARLES S. LOCKWOOD.

Witnesses:
G. C. STULTS,
E. WILLIAMS.